United States Patent [19]
Fernando

[11] Patent Number: 5,471,587
[45] Date of Patent: Nov. 28, 1995

[54] FRACTIONAL SPEED BUS COUPLING

[75] Inventor: Roshan Fernando, Portland, Oreg.

[73] Assignee: Intel Corporation, Santa Clara, Calif.

[21] Appl. No.: 954,871

[22] Filed: Sep. 30, 1992

[51] Int. Cl.[6] .................................................. G06F 13/00
[52] U.S. Cl. ............................................ 395/309; 395/550
[58] Field of Search .................................. 395/325, 550, 395/725, 250, 275

[56] References Cited

U.S. PATENT DOCUMENTS

| | | |
|---|---|---|
| 5,253,348 | 10/1993 | Scalise .................................... 395/325 |
| 5,261,057 | 11/1993 | Coyle et al. ............................ 395/275 |
| 5,274,763 | 12/1993 | Banks .................................... 395/250 |

*Primary Examiner*—Glenn A. Auve
*Attorney, Agent, or Firm*—Owen L. Lamb

[57] ABSTRACT

Apparatus for enabling internal data processing logic including a number of units clocked at a first frequency to operate with an external bus operating at a second frequency that is a fraction m/n of said first frequency. A first bus is connected via readers to data latched for data transfer from the number internal units of the data processing logic to the data latches. A second bus is connected via drivers to the data latches for data transfer from internal bus units to the data latches. The data latches are connected to the external bus. A control circuit connected to the readers and drivers controls the readers and drivers to guarantee that sampling is done when logic is stable. The control circuit includes priority logic for determining priority between the units for permitting a high priority unit to transfer data on the external bus. Upon the condition that m=1 and n is any positive integer, transfer of data from the external bus to the first bus occurs at the point in time that the internal clock and the external clock are aligned. Upon the condition that m=2 and n is any positive odd integer, transfer of data from the external bus to the second bus occurs at the point in time that the internal clock and the external clock are aligned. The priority logic prevents enabling the drivers during any period during which the internal clock and the external clock are not aligned.

24 Claims, 9 Drawing Sheets

FRACTIONAL SPEED BUS COUPLING

BACKGROUND OF THE INVENTION

CROSS-REFERENCE TO RELATED APPLICATIONS

Copending patent application Ser. No. 954,872 filed Sep. 30, 1992, entitled "METHOD AND APPARATUS FOR CHANGING FROM ONE CLOCK MODE TO ANOTHER WITHOUT RESET ON A FRACTIONAL SPEED BUS" of Douglas Carmean et al. filed Sep. 30, 1992, and assigned to Intel Corporation, the assignee of the present invention.

TECHNICAL FIELD

The present invention relates to data processing systems, and more particularly to a bus timing apparatus that operates in fractional speed modes.

BACKGROUND ART

IBM Personal Computers are marketed to various market segments at price/performance levels that basically are related to the clock speed at which the microprocessor operates. This speed determines the kinds of peripheral devices, such as printers and monitors, and memory devices that can be used with the base machine. For example, the Intel 386 DX family of processors are available at speeds of 16, 20, 25 and 33 megahertz (MHz), at proportionally increasing prices. A slower I/O device or memory module that is compatible with a 16 MHz microprocessor will not match the higher speeds of the 20, 25 and 33 MHz microprocessors without logic that couples the internal higher speed buses with the slower external busses operating at a fraction of the internal bus frequency. In the past, coupling between buses operating at different frequencies has been accomplished by either inserting extra clock cycles or by adding wait states to the microprocessor CPU. Both methods result in degraded system performance. To accomplish this in the past required hardware external to the micro processor chip, with different logic for each fractional speed desired.

It is an object of this invention to provide a bus timing apparatus that operates in fractional speed modes without inserting extra clock cycles or by adding wait states.

It is also an object of this invention to provide a bus timing apparatus that operates in fractional speed modes wherein the bus fraction value is programmable by the user.

SUMMARY OF THE INVENTION

Briefly, the above object is accomplished in accordance with the invention by providing an apparatus for enabling internal data processing logic that includes a number of units clocked at a first frequency to operate with an external bus operating at a second frequency that is a fraction m/n of said first frequency. A first bus is connected via readers to data latches for data transfer from the number internal units of the data processing logic to the data latches. A second bus is connected via drivers to the data latches for data transfer from internal bus units to the data latches. The data latches are connected to the external bus. A control circuit connected to the readers and drivers controls the readers and drivers to guarantee that sampling is done when logic is stable. The control circuit includes priority logic for determining priority between the units for permitting a high priority unit to transfer data on the external bus. Upon the condition that m=1 and n is any positive integer, transfer of data from the external bus to the first bus occurs at the point in time that the internal clock and the external clock are aligned. Upon the condition that m=2 and n=3, transfer of data from the external bus to the second bus occurs at the point in time that the internal clock and the external clock are aligned and at safe clock edges. The priority logic prevents enabling the drivers during any period during which the internal clock and the external clock are not aligned.

The invention has the advantage that data are transferred between busses of different bus speeds without inserting extra clock cycles or by adding wait states, or having to modify any of the existing bus protocols of the system bus.

DESCRIPTION OF THE DRAWINGS

The foregoing and other objects, features, and advantages of the invention will be apparent from the following more particular description of the preferred embodiments of the invention as illustrated in the accompanying drawings, wherein.

DESCRIPTION

Figure 1:
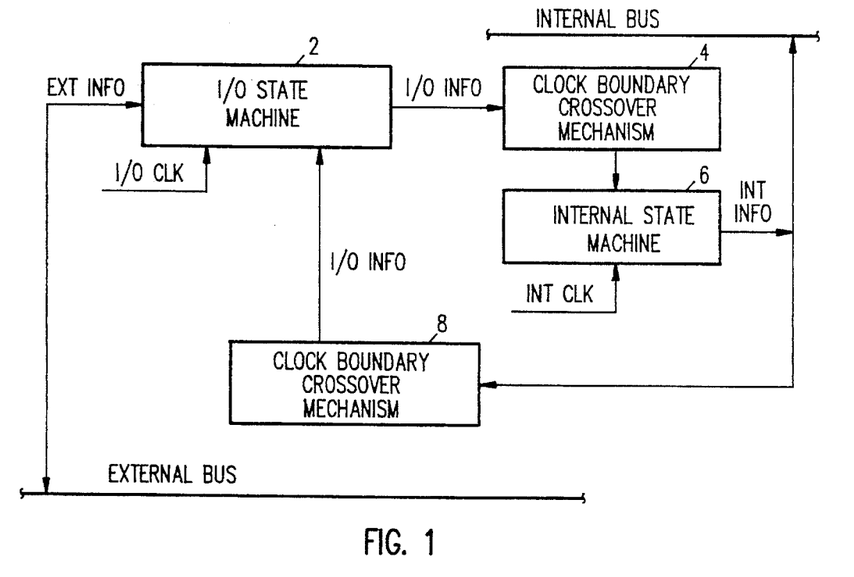
FIG. 1 is a block diagram conceptually illustrating the present invention.

Refer to FIG. 1 which is a block diagram conceptually illustrating the present invention. In this specification, the following nomenclature will be used. EXT CLK is the clock of the external bus. I/O CLK is the clock of the same frequency and phase as the external bus clock. INT CLK is the core (internal) clock. INT INFO is the Data/control of the core logic on the chip which operates at the internal clock frequency. EXT INFO is the Data/control from the external bus. I/O INFO is the Data/control from the bus logic that runs at tile I/O clock frequency.

FIG. 1 shows logic that runs at the external bus frequency is coupled to the logic that runs at the internal bus frequency. Every time information (data or controls) cross over the frequency domains, that is from the internal clock frequency to the external clock frequency or from the external clock frequency to the internal clock frequency, there are fixed rules (a clock boundary crossover mechanism) that synchronize this operation.

External information is clocked under control of the EXT CLK by external agents (2) and becomes I/O information at the output of the I/O state machine (2). A clock boundary crossover mechanism (4) in accordance with the present invention synchronizes the I/O information transfer to the INT CLK time domain of the internal state machine (6). The internal state machine (6) provides INT INFO, the Data/control of the core logic which is transferred to the internal bus.

A clock boundary crossover mechanism (8) in accordance with the present invention synchronizes the INT INFO transfer to the I/O CLK time domain of the I/O state machine (2). The I/O state machine (2) provides I/O INFO which is the Data/control from the bus logic that runs at the I/O clock frequency which is transferred as EXT INFO to the external bus.

Figure 2:
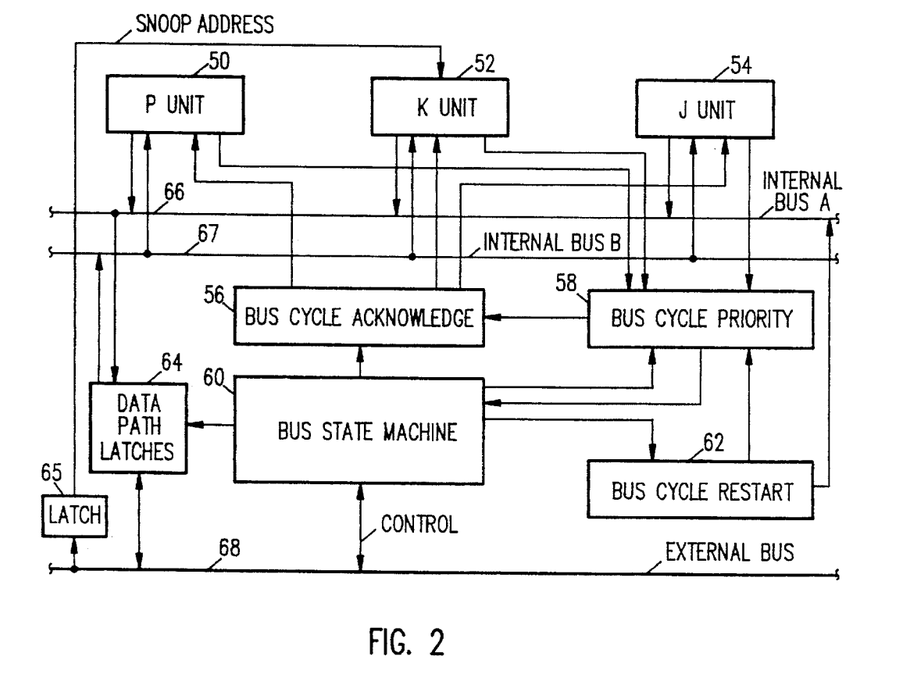
FIG. 2 is a functional block diagram illustrating each of the major components of a microprocessor in which the present invention is embodied.

Refer to FIG. 2 which is a block diagram of a data processing system in which the present invention is embodied.

The K unit (52) contains a data cache and translation lookaside buffer (TLB) and the J unit (54) contains an instruction unit and TLB. The P unit (50) contains a TLB with logic to refill the K unit and J unit TLB's. Each unit is responsible for a particular task in the execution of instructions in a five-stage pipeline. A first 32-bit internal bus, internal bus A (66) transfers information from an external bus (68) to each of the units. A second 32-bit internal bus, internal bus B (67) transfers information from each of the units to the external bus (68). A bus state machine (60) interfaces the units to the external bus (68). Data path latches (64) latch data between the internal bus and the external bus. A snoop path latch (65) latches a snoop address on the external bus. A bus cycle priority logic (58) receives priority requests from each of the units and grants one unit priority to the external bus. The bus cycle restart (62) logic allows an external system to retry a bus cycle if a bus parity error occurs during a memory access.

The bus state machine (60), bus cycle acknowledge (56), bus cycle priority (58) and bus cycle restart (62) comprise a B unit. The B unit provides the interface between the internal logic and the external bus. It is the B unit that runs cycles on behalf of the internal units onto the external bus. The four units (K, P, J and B) can request cycles from the B unit. These requests enter the bus-cycle priority logic in the B unit. Once the priority is resolved, the priority logic issues a cycle request to the bus-state machine which initiates a bus cycle on the external bus. The unit that wins the priority for the external bus on a given clock cycle also gets to drive the internal bus A with the cycle information. Once the cycle is started on the external bus, the bus-acknowledge machine (56) in the B unit acknowledges to the requesting unit that its cycle has been accepted by the B unit. Once a cycle has been accepted by the B unit, it transfers data from the internal bus A to the external bus on write operations. On read operations, the B unit fetches data from the external bus and transfers it to the internal bus B from where it is read by the requesting unit. To run external bus cycles, communication between the B unit and the rest of the units is through a handshake mechanism.

For control signals, the bus-cycle priority logic and the bus-cycle-acknowledge machine are the major interface units between the B unit and the rest of the chip. For data path, the internal bus (BADDR, BWRBUS, BRDBUS, etc.) is the major interface.

In addition to running external bus cycles, the B unit also interfaces control signals between the external bus and the internal logic.

Snoop Mechanism

In a multiprocessor environment there may be more than one processor sharing thone processor s same memory space. Suppose the data are stored in the cache of one processor and the other processor goes to external memory for the same data. If the second processor changes the data in memory, then the data in the first processor's cache would be corrupted. A snoop signal is sent to every processor and monitored by each processor. If any processor has a local private copy of the data at the address of the line indicated by the snoop signal, then it must go into its cache and invalidate that line. There is an address on the bus, the snoop address, associated with the snoop signal. Therefore, if there is an address on the external bus and the snoop signal is raised, then the processor must go in and invalidate that local private copy of the data. In the system shown in FIG. 2 the snoop address enters the K unit (52) which performs the necessary tasks to invalidate the data.

Fractional-speed Bus

In a fractional-speed bus there are two clocks: an external clock and an internal clock. The external clock runs at the external clock (I/O clock) frequency and the internal logic runs at the internal clock (INT CLK) frequency. Therefore, the logic in the B unit has to work in at least two clock domains, i.e., the internal clock domain and I/O clock domain. This leads to two problems:

(1) The boundary (4 and 8) of FIG. 1 at which the clock domains interface must be defined. This means identifying which parts of the B unit should work at the external I/O clock frequency and which parts should work at the internal clock frequency.

(2) How to synchronize these two clock domains must be determined. This involves the interface between the two clock domains, i.e., the control information (data and control signals) transfer between the clock domains.

In accordance with the present invention, only two clocking schemes exist for both data path and control signals. The $1/n$ fraction case, where n is any positive integer, and the $2/3$ fraction case. The 1X fraction case is covered in the $1/n$ fraction case. In either case, since the logic must work at 1X all paths must work at 1X. Therefore, if the external bus is working at $2/3$ fraction, the logic in the I/O clock domain still works at 1X speed in terms of nanosecond delays, even though the state machine latches are clocked with a $2/3$ fractional clock. (Note that 1X implies that the internal logic is working at the highest frequency, for example, at 100 MHz).

In identifying the boundary between clock domains, a minimal interface point is the major factor. The fact that the bus priority logic and the bus-acknowledge machines are the major two units that talk to the internal units leads to partition of the B unit into two clock domains. The data path latches, the bus state machine, and bus cycle restart are in a first clock domain. The P-unit, K-unit, J-unit, bus cycle acknowledge, and bus cycle priority are in a second clock domain.

Data Path Clock Boundary Crossing Mechanism

Handling the data path requires that the internal buses work in both the I/O clock and the internal clock domains. In accordance with the present invention, the internal busses are implemented as two sets of separate buses, one set of buses (bus A) for data transfer from the internal units to the external bus (BADDR, BTYPE, BWRBUS, BLEN, etc.) and one set of buses (bus B) for the data transfer from the external bus to the internal units (BRDBUS, BSNPADR, etc.). Data from the internal units comes at the internal clock frequency and is read out at the I/O clock frequency to the external bus. External data comes at the external clock (I/O clock) frequency and is read out at the internal clock frequency. Since the reading and writing frequencies are different, the logic ensures that data are not sampled by the readers until it is guaranteed to be stable. Otherwise, wrong data would be latched, and reliability problems would arise in the readers.

The data path is always controlled by the control signals, and therefore both the readers and the drivers are controlled to guarantee that proper sampling is done. For example, readers are enabled only after the data are guaranteed to be stable.

Figure 3:
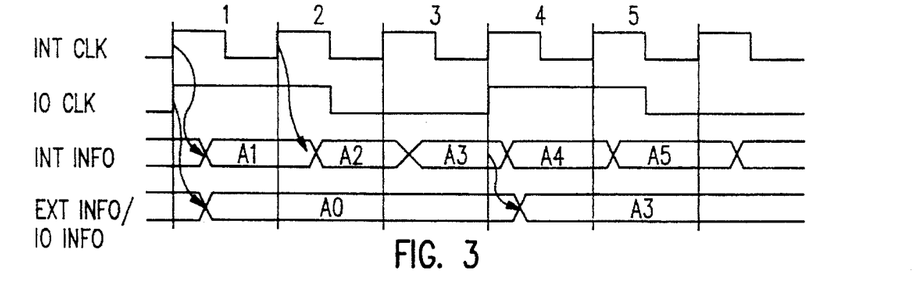
FIG. 3 is a timing diagram illustrating data transfers from internal to external for the 1/n fraction case.

As shown in FIG. 3, when the external bus clock is running at frequency $1/n$, the internal data are allowed to change at every internal clock edge. Whichever unit that wins the priority when the internal clock aligns with the I/O clock gets to transfer the data to the I/O clock domain. Once the data are in the I/O clock domain, it is driven to the external bus with no further modification. All other units arbitrate again for access to the internal bus to be granted a cycle on the external bus. The priority logic is such as to not cause starvation of bus access for lower priority units.

Figure 4:
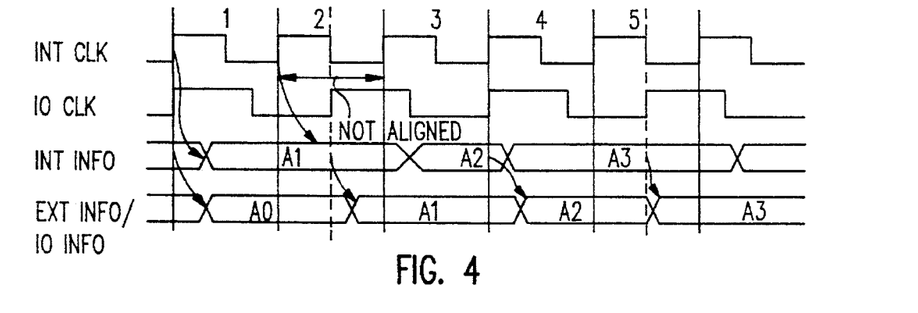
FIG. 4 is a timing diagram illustrating data transfers from internal to external for the 2/3 fraction case.

In FIG. 4, when the external clock is running at $2/3$ fraction the internal data are not allowed to change at every clock edge. The data on the internal bus does not change in clock cycle 2. This is because of the rising edge of the I/O clock that occurs in the middle of the clock cycle 2. If the internal data were allowed to change with clock cycle 2, then at the rising edge of the I/O clock the data might not be stable enough to sample reliably. To correct this situation, the priority logic is not allowed to grant a bus access in clock cycle 2; i.e., the selected driver is not changed.

Figure 5:
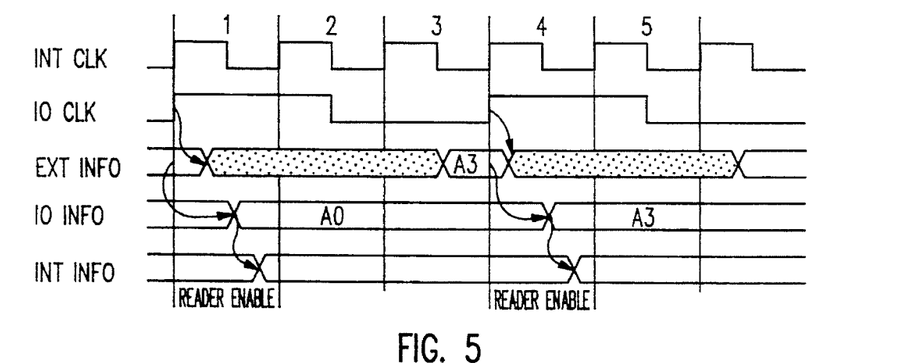
FIG. 5 is a timing diagram illustrating data transfers from external to internal for the 1/n fraction case.

As shown in FIG. 5, when the bus clock is running at $1/n$ fraction, data are transferred from the external clock (EXT INFO) to the internal clock (INT INFO). The latched version of the data path comes at the I/O clock frequency (I/O INFO), and is read into the internal clock frequency logic domain with no further modification. To guarantee sufficient setup times, the internal readers are enabled only in the clock immediately following the INT CLK and I/O CLK alignment edge giving the readers a setup of one full internal clock cycle.

Figure 6:
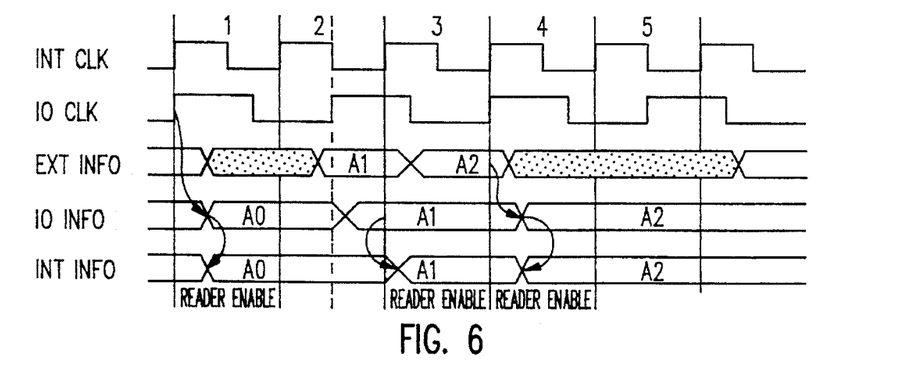
FIG. 6 is a timing diagram illustrating data transfers from external to internal for the 2/3 fraction case.

As shown in FIG. 6, when the external clock is running at $2/3$ fraction, at clock cycle 2 the I/O INFO comes at an unaligned edge with respect to the internal clock and is not sampled at the rising edge of clock 3, as this could sample wrong data. Since all internal bus readers have enable-type flip-flops, data are allowed to go into the internal bus but the readers are disabled to prevent the readers from sampling unstable data. Readers are enabled only after the nonaligned clock edge is passed.

Summary of Data Path Clock Boundary Crossing Mechanism

If a transfer is from internal (INT INFO) to external (EXT INFO or I/O INFO), the driver of the data path is not allowed to change in the unaligned clock. This is done by not changing the priority logic machine in the B unit in that internal clock cycle. To achieve this, a new clock TRCLK 1 is generated which does not have a rising edge in the unaligned clock period.

If a transfer is from external to internal the data are brought into I/O INFO by latching the external data. Readers are controlled such that the internal bus is not read during the unaligned clock.

Control Information Clock Boundary Crossing Mechanism

Control information transfer between the two clock domains is more complex than for the data path because there are two classes of control signals:

Class 1 and Class 3. Signals that are handshake or pseudo handshake. Pseudo handshake signals go high for a predetermined number of clocks (most of the time 1).

Class 2 and Class 4. Signals that can go high for X number (x=1, 2, . . . ) of clocks and are not handshake (level signals).

Class 1 Control Signals

Signals that come from the I/O clock domain to the internal clock domain that are high for X number of clocks (level signals):

In this case if it is a signal in the I/O clock domain (I/O INFO), this could be a latched version of a bus signal, then it is transferred to the internal clock domain (INT INFO) after alignment ($2/3$ fractional situation). If the signal is an external bus signal (EXT INFO) going into INT INFO, then the signal needs to be taken into the I/O clock logic domain (latch it with a I/O clock, i.e., sampled) and then to the internal clock domain as stated above. Between sampling points the INT INFO signal must be retained at the last sampled value.

Figure 7A:
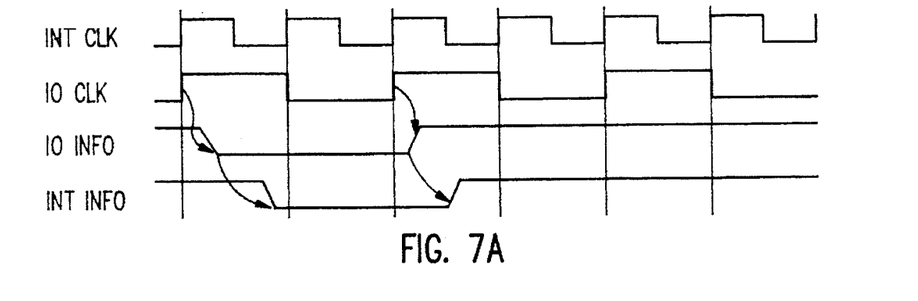
FIGS. 7A and 7B are timing diagrams illustrating class 1 signals, for the 1/n fraction case.
Figure 7B:
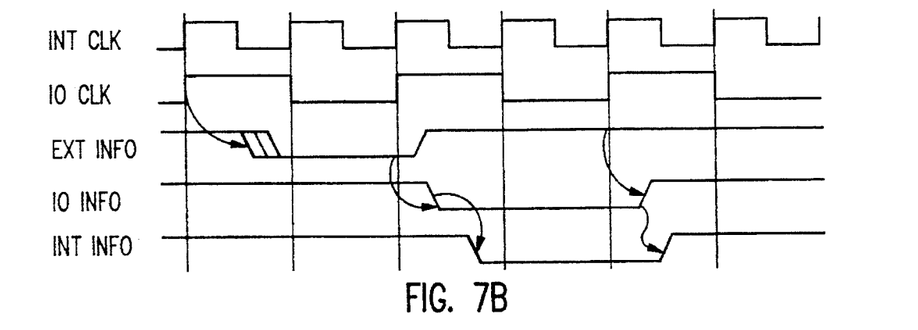
Figure 8A:
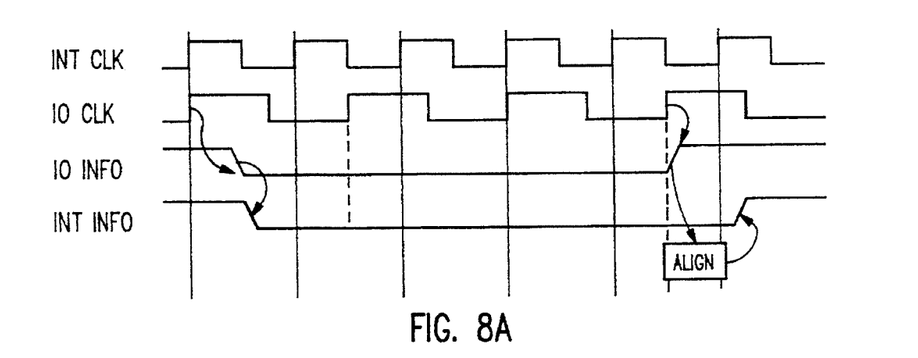
FIGS. 8A and 8B are timing diagrams illustrating class 1 signals, for the 2/3 fraction case.
Figure 8B:
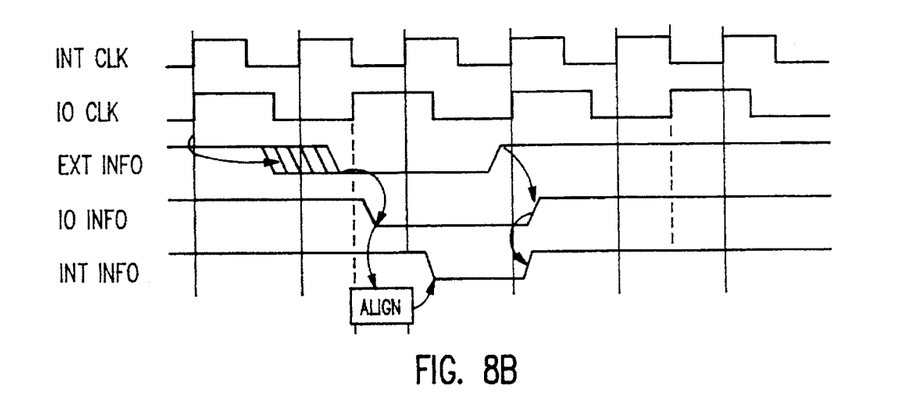
Figure 9A:
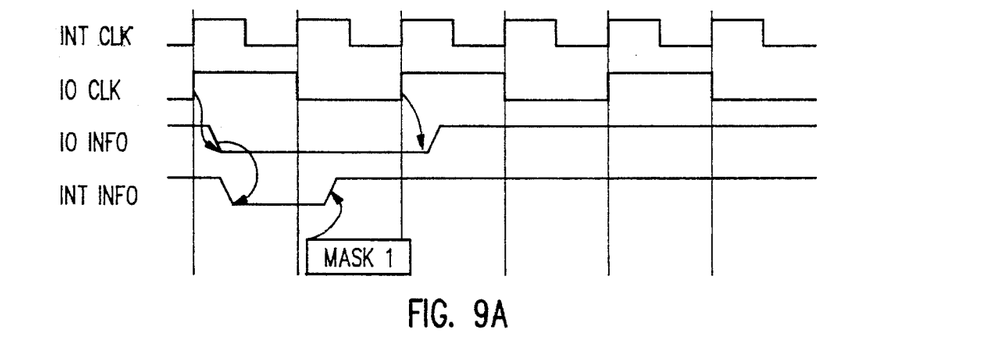
FIGS. 9A and 9B are timing diagrams illustrating class 2 signals, for the 1/n fraction case.
Figure 9B:
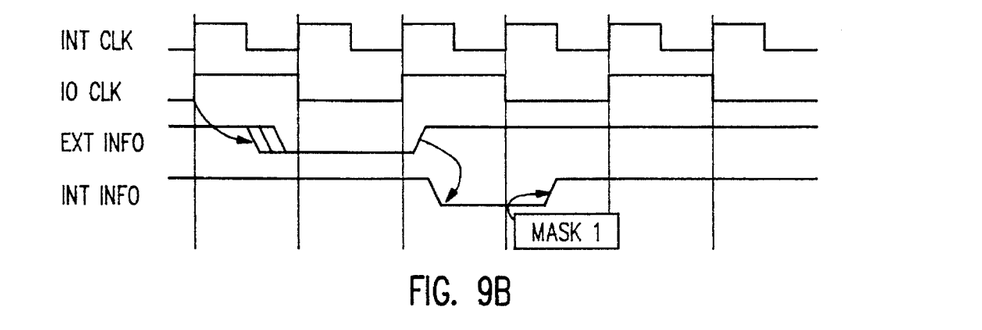
Figure 10A:
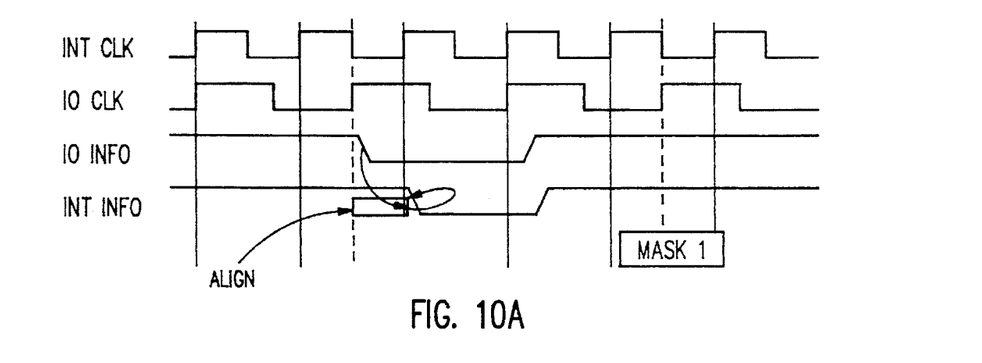
FIGS. 10A and 10B are timing diagrams illustrating class 2 signals, for the 2/3 fraction case.
Figure 10B:
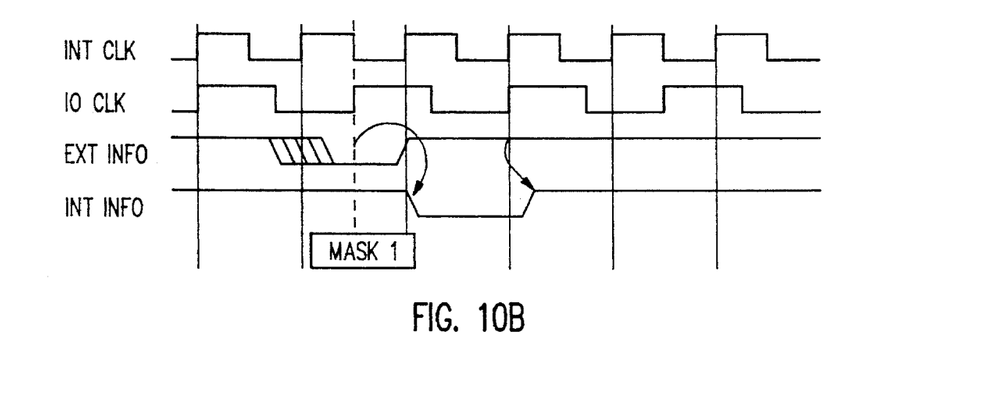
Figure 11:
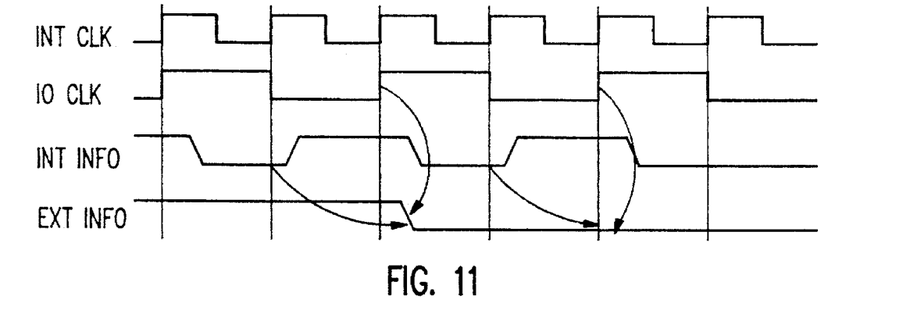
FIG. 11 is a timing diagram illustrating class 3 signals, 1/n fraction case.
Figure 12:
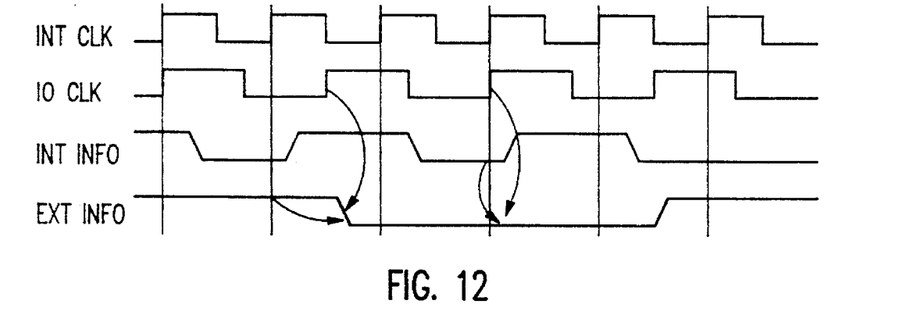
FIG. 12 is a timing diagram illustrating class 3 signals, for the 2/3 fraction case.

In the $1/n$ fraction case, shown in FIGS. 7A and 7B, I/O information always comes aligned to the internal clock. In the $2/3$ fraction case, shown in FIG. 8A and 8B, I/O information could come nonaligned to the internal clock. In this case, information needs to be shifted so that the I/O information is aligned to the internal clock edge.

Since the I/O information is guaranteed to be stable after one internal clock, once the information is aligned it is sampled by the internal clock without further modification.

On the other hand, the external information first needs to be brought into the I/O clock domain by latching it with an I/O clock. The latched signal is an I/O INFO and is able to traverse to the internal clock domain as explained above. If the external signal cannot be latched by an I/O clock, then a window is opened for the external signal to be sampled by the internal clock.

Class 2 Control Signals

Signals that come from the I/O clock/external bus domain to the internal clock domain that are handshake or pseudo handshake.

These signals indicate that the I/O clock logic detected an event that needs to be triggered in the internal core logic. The event is triggered only once, i.e., each time the value is sampled externally. It is guaranteed that the event is triggered only once per sampled value irrespective of the number of internal clock edges per I/O clock. FIGS. 9A and 9B and FIGS. 10A and 10B show this situation for an active low type of triggering signal. Before EXT INFO becomes INT INFO, it needs to become I/O INFO.

The same alignment issue exists as in Class 1. Also if there are more than one internal clock edges within an I/O clock period, the trigger is masked after one internal clock. Similar to the previous case, signals crossing from the external bus to the internal clock domain need to cross after having been latched.

Class 3 Control Signals

Signals that cross from the internal clock domain to the I/O clock domain and are high for X number of clocks (level signals):

There is a possibility that the internal signal may go low for one internal clock to indicate an event. During this clock the I/O clock may not have an edge to sample the internal signal. Therefore, a flip-flop that works on the internal clock is employed that gets set when the event is detected and gets reset once the B unit transfers this information to I/O clock domain.

Class 4 Control Signals

Figure 13:
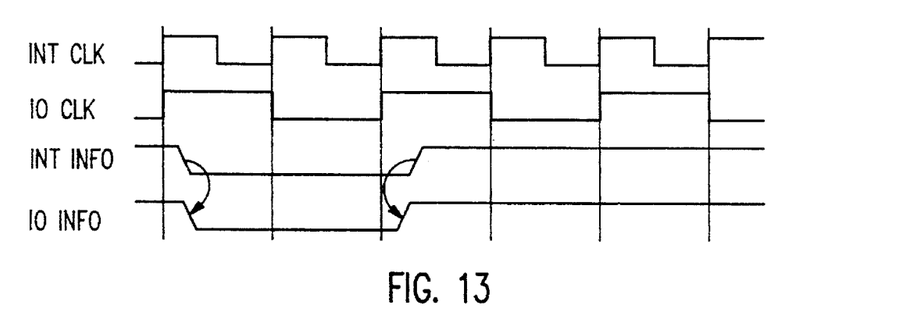
FIG. 13 is a timing diagram illustrating class 4 signals, for the 1/n fraction case.
Figure 14:
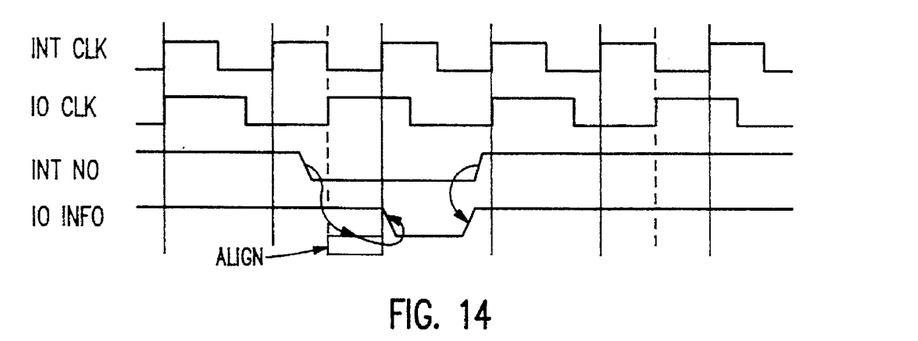
FIG. 14 is a timing diagram illustrating class 4 signals, for the 2/3 fraction case.

Signals that come from the internal clock domain to the I/O clock domain that are handshake or pseudo handshake:

In the 1/n action case, shown in FIG. 13, the internal information always comes aligned to the I/O clock. Since these signals are handshakes, once asserted they will not change until the B unit responds to the signal. Therefore, unlike the previous case, there is no need of a set/reset mechanism to transfer the information. In the ⅔ fraction case, shown in FIG. 14, the internal information could come nonaligned to the I/O clock. This internal information is shifted to an aligned I/O clock edge such that the generation of the INT INFO is prevented at the unaligned clock.

Snoop Mechanism

In the prior art, the snoop address uses a direct path from the external bus to the K unit where it is clocked at the frequency of the internal clock domain.

In the case of the snoop mechanism of the present invention, caches directly interfaces with the external bus for address path via address latch (65) and the control path goes through the B unit.

Figure 15:
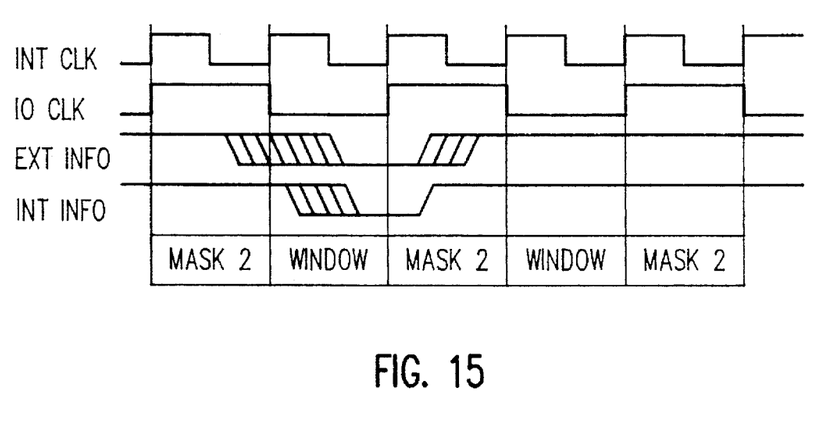
FIG. 15 is a timing diagram illustrating snoop signals, for the 1/n fraction case.
Figure 16:
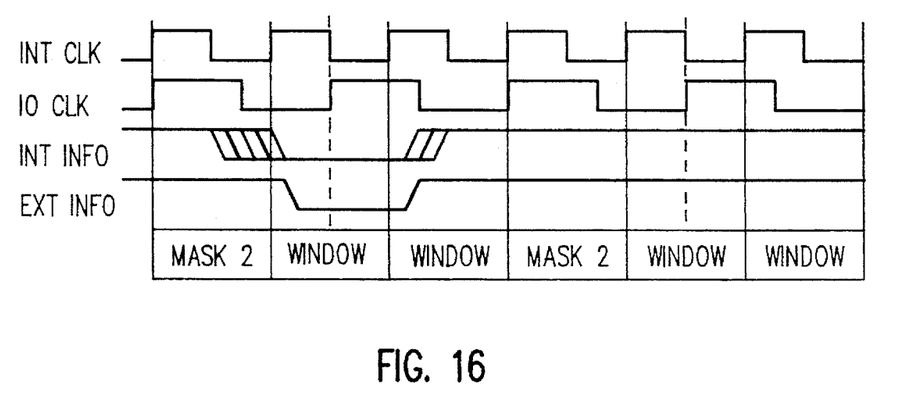
FIG. 16 is a timing diagram illustrating snoop signals, for the 2/3 fraction case.

Refer to FIG. 15 and FIG. 16. In the present invention, the snoop on the external bus occurs at the frequency of the I/O clock domain. Accordingly, the snooping mechanism of the prior art is modified. A new clock called TRCLK2 is generated. All flip-flops that sample the snoop address sample it with TRCLK2. Similarly, the EADS# or signals that are a qualified version of EADS# are sampled with TRCLK1.

Clock Signals

A Clocking Scheme for the different class of signals is provided.

TRCLK1 is provided to clock the priority machine so that the enable input to the drivers on the internal bus data path do not change during the times the INT and I/O clocks are not aligned.

TRCLK2 is a clock for the snoop mechanism. TRCLK2 is the same as TRCLK1 in the ⅔ fraction case. In the case of 1/n, TRCLK2 is high when the internal and the external clocks align.

Clock Generation

Figure 17:
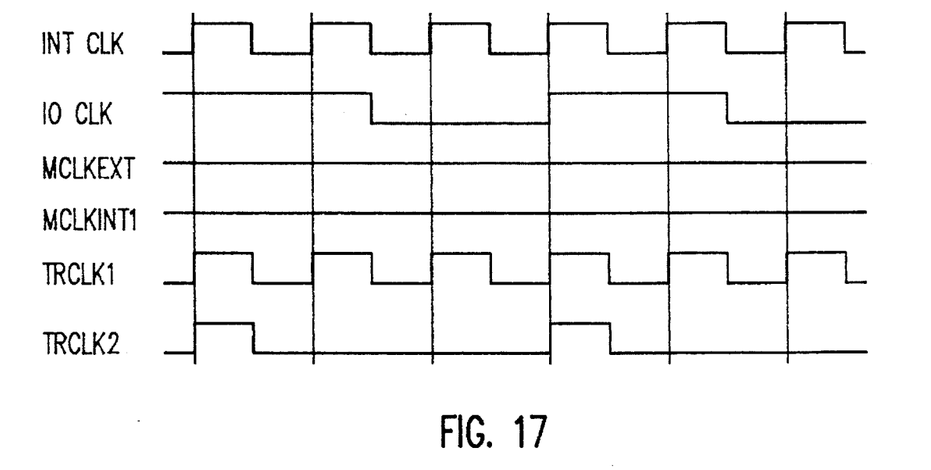
FIG. 17 is a timing diagram illustrating a clocking scheme for the 1/n fraction case.
Figure 18:
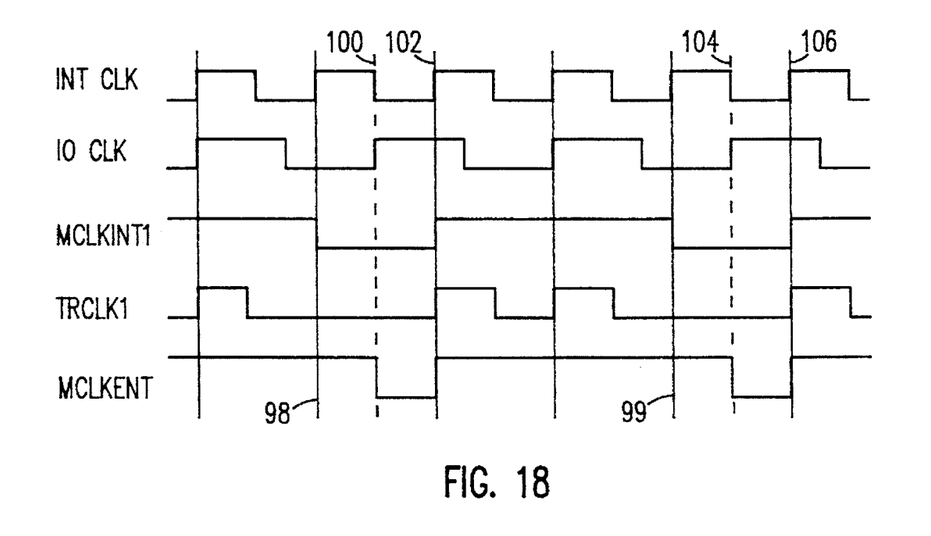
FIG. 18 is a timing diagram illustrating a clocking scheme for the 2/3 fraction case.

Refer to FIG. 17 and FIG. 18. The following describes the method of generation of clocks in accordance with the present invention.

MCLKEXT

MCLKEXT is asserted high until a point (100) is reached in FIG. 18 where the next rising edge of the I/O CLK occurs but that rising edge of the I/O CLK does not coincide with a rising edge of the INT CLK. At that point (100) MCLKEXT is asserted low and held low until the next rising edge (102) of the INT CLK occurs, at which time (102) MCLKEXT is asserted high.

MCLKEXT is what indicates that it is permissible to transfer information from one clock domain to the other.

TRCLK1

If the clock fraction is 1/n, then same as the internal clock. If the clock fraction is ⅔, then mask the high period of the 1 clock of the internal clock after a clock alignment.

MCLKINT1

If the clock is 1/n, then MCLKINT1 is always high—else it will go low with the internal clock rising edge immediately following an alignment until the next internal clock rising edge.

MCLKINT1 is asserted and kept asserted until a point (98) at which an INT CLK rising edge occurs that does not coincide with a rising edge of the EXT CLK. At that point (98) MCLKINT1 is deasserted. MCLKINT1 is kept deasserted until the next rising edge (102) of the INT CLK at which point (102) MCLKINT1 is asserted.

MCLKINT1 is kept asserted until a point (99) at which an INT CLK rising edge occurs that does not coincide with a rising edge of the EXT CLK. At that point (99) MCLKINT1 is deasserted. MCLKINT1 is kept deasserted until the next rising edge (106) of the INT CLK at which point (106) MCLKINT1 is asserted

TRCLK2

In the case of 1/n, TRCLK2 is high when the internal and the external clocks align. In the ⅔ fraction case, TRCLK2 is same as TRCLK1.

Clock Signal Generation Flow

Figure 19A:
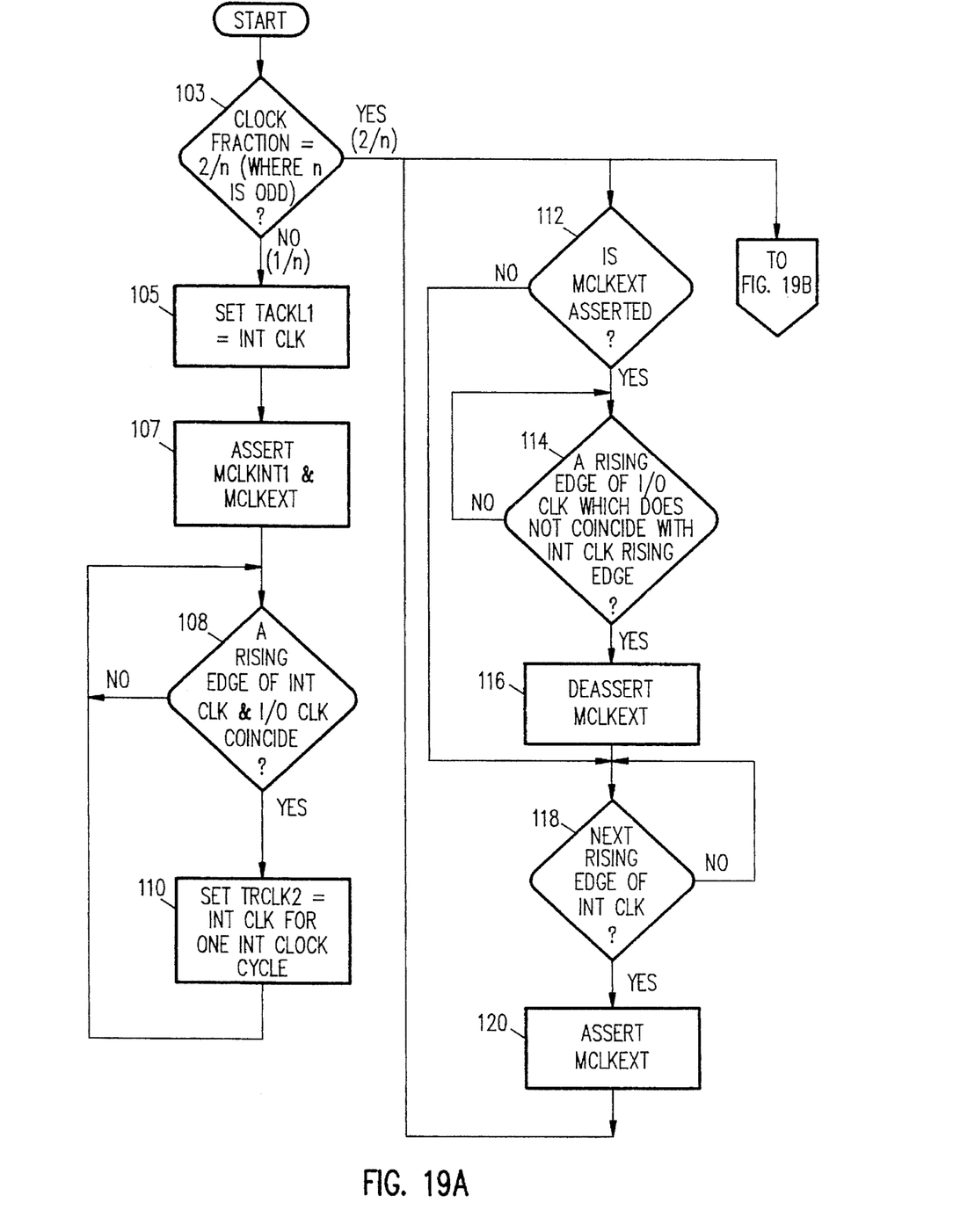
FIGS. 19A and 19B are a flow chart of the timing method of the present invention.
Figure 19B:
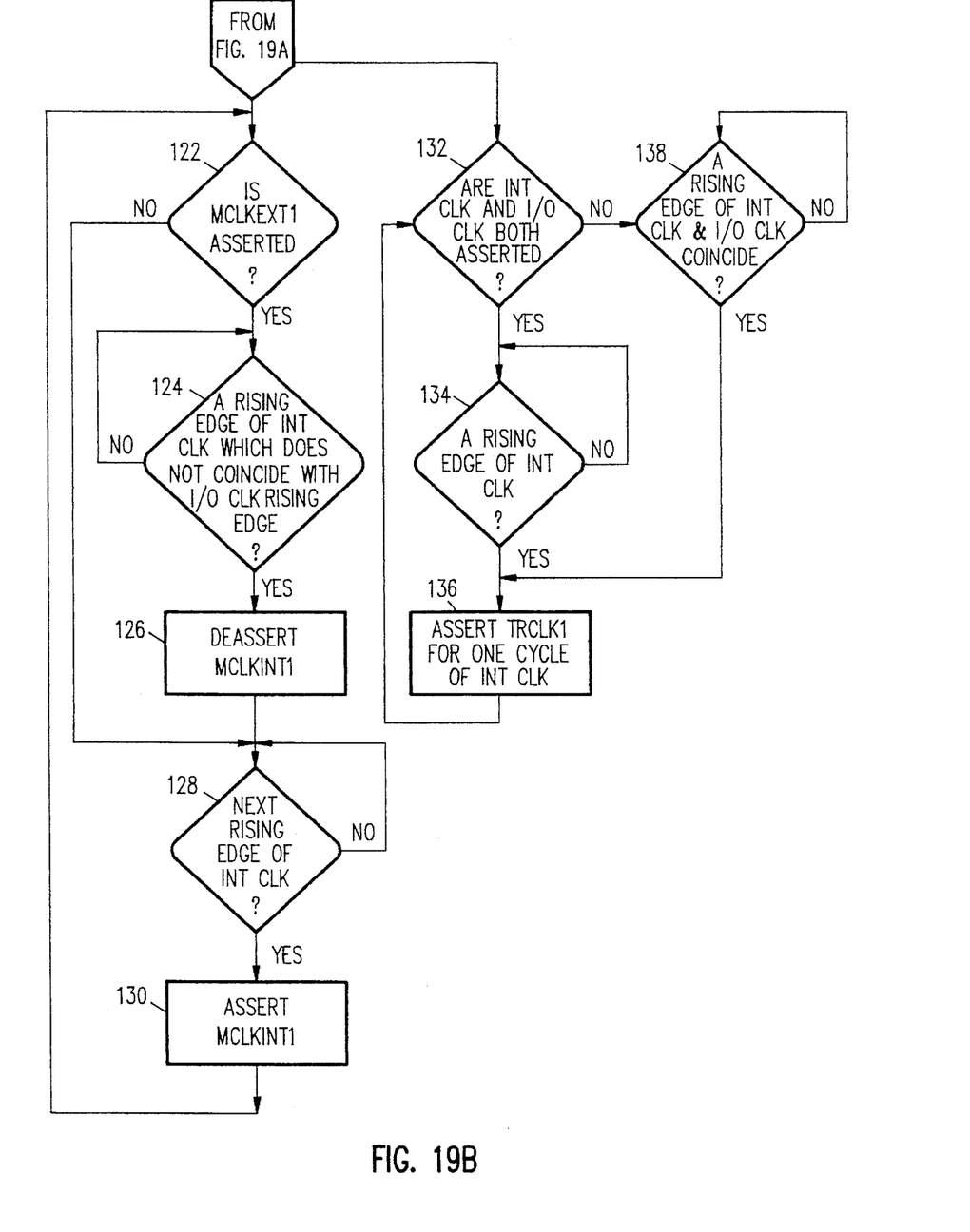

The following describes a flow diagram of the method of generation of clocks in accordance with the present invention, with reference to the flow diagrams of FIGS. 19A and 19B. Either the ⅔ fraction case or the ⅕ₙ fraction case is selected at decision block (102).

⅕ₙ Fraction Case

In FIG. 19A and the timing diagram of FIG. 19 TRCLK1 is the same as the internal clock (103). MCLKINT1 and MCLKEXT are asserted (105). When a rising edge of the I/O CLK and INT CLK coincide (107), TRCLK2 is set equal to the INT CLK for one cycle of the INT CLK (110). TRCLK2, is used for snoop cycle, as shown in FIG. 18.

⅔ Fraction Case

Refer to FIG. 21A. If an I/O clock rising edge occurs (114) with no coincident internal clock rising edge, then MCLKEXT is deasserted (116) until the next internal clock rising edge (118) at which point MCLKEXT is asserted (120). This is shown in the timing diagram of FIG. 18.

Refer to FIG. 21B. If a rising edge of the INT CLK occurs which does not coincide with an I/O CLK rising edge, then MCLKINT1 is deasserted (126). At the next internal clock rising edge (128) MCLKINT1 is asserted (128). This is shown in the timing diagram of FIG. 18.

Refer to FIG. 21B. If the INT CLK and EXT CLK are both asserted (132), and a rising edge of the I/O clock occurs (134), then TRCLK1 is the same as the internal clock for one clock cycle of the internal clock after a clock alignment occurs (134). If a rising edge of the I/O clock and a rising edge of the INT clock occur (138), then TRCLK1 is the same as the internal clock for one clock cycle of the internal clock. This is shown in the timing diagram of FIG. 18. While the invention has been particularly shown and described with reference to preferred embodiments thereof, it will be understood by those skilled in the art that the foregoing and other changes in form and detail may be made therein without departing from the scope of the invention.

What is claimed is:

1. Apparatus for enabling internal data processing logic that includes a number of units clocked by an internal clock operating at a first frequency to operate with an external bus clocked by an external clock operating at a second frequency that is a fraction m/n of said first frequency comprising:

an internal bus connected to said number of units;

said internal bus including readers and drivers for effecting data transfer between said internal bus and said number of units; and, control means connected to said internal bus for controlling said readers and drivers;

said control means including priority logic connected to said readers and drivers, responsive to said number of units for determining priority between said units with respect to transfer of data on said external bus with a selected one of said units;

said control means further including first means operative upon a condition that m=1 and n is an integer of the integers 1, 2, and 3, for transferring data from said internal bus to said selected one of said units on every rising edge of said external clock and for transferring data from said selected one of said units to said internal bus at a point in time that said internal clock and said external clock are aligned.

2. The apparatus in accordance with claim 1 wherein:

said control means further includes second means operative upon a condition that m=2 and n=3, for transferring data from said internal bus to said selected one of said units on every external clock rising edge and for transferring data from said selected one of said units to said internal bus at the point in time that said internal clock and said external clock are aligned while preventing said priority logic from enabling said drivers during any period during which said internal clock and said external clock are not aligned.

3. The apparatus in accordance with claim 2 wherein:

said control means further includes third means operative upon a condition that m=1 and n=3, for transferring data from said internal bus to said selected one of said units on every internal clock edge and for transferring data from said selected one of said units to said external bus at the point in time that said internal clock and said external clock are aligned; and, said control means further includes fourth means operative upon a condition that m=2 and n=3, for transferring data from said internal bus to said units on every internal clock edge and for transferring data from said units to said external bus at a point in time that said internal clock and said external clock are aligned while concurrently preventing said priority logic from enabling said drivers during any period during which said internal clock and said external clock are not aligned.

4. Apparatus for enabling internal data processing logic that includes a number of units clocked by an internal clock operating at a first frequency to operate with an external bus clocked by an external clock operating at a second frequency that is a fraction m/n of said first frequency comprising:

means for latching data;

a first bus connected to said means for latching data and to said number of units via readers for effecting data transfer from said means for latching data to said number of units;

a second bus;

said means for latching data being connected to said external bus and to said second bus;

said second bus being connected to said number of units via drivers for effecting data transfer from said units to said means for latching data; and, control means connected to said readers and drivers for controlling said readers and drivers;

said control means including priority logic connected to said readers and drivers, responsive to said number of units, for determining priority between said units with respect to transfer of data on said external bus;

said control means further including first means operative upon a condition that m=1 and n=3, for transferring data from said external bus to said means for latching data on every external clock rising edge and for transferring data from said means for latching data to said first bus at the point in time that said internal clock and said external clock are aligned;

said control means further including second means operative upon a condition that m=2 and n=3, for transferring data from said external bus to said means for latching data on every external clock rising edge and for transferring data from said means for latching data to said second bus at the point in time that said internal clock and said external clock are aligned while preventing said priority logic from enabling said drivers during any period during which said internal clock and said external clock are not aligned.

5. The apparatus in accordance with claim 4 wherein:

said control means further includes third means operative upon a condition that m=1 and n=3, for transferring data from said second bus to said means for latching data on every internal clock edge and for transferring data from said means for latching data to said external bus at the point in time that said internal clock and said external clock are aligned; and, said control means further includes fourth means operative upon a condition that m=2 and n=3, for transferring data from said second bus to said means for latching data every internal clock edge and for transferring data from said means for latching data to said second bus at a point in time that said internal clock and said external clock are aligned while concurrently preventing said priority logic from enabling said drivers during any period during which said internal clock and said external clock are not aligned.

6. Apparatus for enabling internal data processing logic that includes a number of units clocked by an internal clock operating at a first frequency to operate with an external bus clocked by an external clock operating at a second frequency that is a fraction m/n of said first frequency comprising:

an internal bus connected to said number of units;

said internal bus including readers and drivers for effecting data transfer between said internal bus and said number of units;

a bus state machine;

priority logic connected to said readers and drivers, and to said bus state machine, responsive to said number of units for determining priority between said units with respect to transfer of data on said external bus with a selected one of said units; and, said bus state machine including first logic operative upon a condition that m=1 and n is an integer of the integers 1, 2, and 3 for transferring data from said internal bus to said selected one of said units on every rising edge of said external clock and for transferring data from said selected one of said units to said internal bus at a point in time that said internal clock and said external clock are aligned.

7. The apparatus in accordance with claim 6 wherein:

said bus state machine further includes second logic operative upon a condition that m=2 and n=3, for transferring data from said internal bus to said units on every external clock rising edge and for transferring data from said units to said internal bus at the point in time that said internal clock and said external clock are aligned while preventing said priority logic from enabling said drivers during any period during which said internal clock and said external clock are not aligned.

8. The apparatus in accordance with claim 7 wherein:

said bus state machine further includes third logic operative upon a condition that m=1 and n is an integer of the integers 1, 2, and 3, for transferring data from said internal bus to said units on every internal clock edge and for transferring data from said units to said external bus at the point in time that said internal clock and said external clock are aligned; and, said bus state machine further includes fourth logic operative upon a condition that m=2 and n=3 for transferring data from said internal bus to said units on every internal clock edge and for transferring data from said units to said external bus at a point in time that said internal clock and said external clock are aligned while concurrently preventing said priority logic from enabling said drivers during any period during which said internal clock and said external clock are not aligned.

9. Apparatus for enabling internal data processing logic that includes a number of units clocked by an internal clock operating at a first frequency to operate with an external bus clocked by an external clock operating at a second frequency that is a fraction m/n of said first frequency comprising:

data path latches for latching data;

a first bus connected to said data path latches and to said number of units via readers for effecting data transfer from said data path latches to said number of units;

a second bus;

said data path latches being connected to said external bus and to said second bus;

said second bus being connected to said number of units via drivers for effecting data transfer from said units to said data path latches; and, a bus state machine;

priority logic connected to said readers and drivers, and to said bus state machine, responsive to said number of units, for determining priority between said units with respect to transfer of data on said external bus with a selected one of said units; and, said bus state machine including first logic operative upon a condition that m=1 and n is an integer of the integers 1, 2, and 3, for transferring data from said external bus to said data path latches on every external clock rising edge and for transferring data from said means for latching data to said first bus at the point in time that said internal clock and said external clock are aligned;

said bus state machine further including second logic operative upon a condition that m=2 and n=3, for transferring data from said external bus to said data path latches on every external clock rising edge and for transferring data from said data path latches to said second bus at a point in time that said internal clock and said external clock are aligned while preventing said priority logic from enabling said drivers during any period during which said internal clock and said external clock are not aligned.

10. The apparatus in accordance with claim 9 wherein:

said bus state machine further includes third logic operative upon a condition that m=1 and n is an integer of the integers 1, 2, and 3, for transferring data from said second bus to said means for latching data on every internal clock edge and for transferring data from said means for latching data to said external bus at the point in time that said internal clock and said external clock are aligned; and, said bus state machine further includes fourth logic operative upon a condition that m=2 and n=3, for transferring data from said second bus to said data path latches every internal clock edge and for transferring data from said second bus to said means for latching data at a point in time that said internal clock and said external clock are aligned while concurrently preventing said priority logic from enabling said drivers during any period during which said internal clock and said external clock are not aligned.

11. Apparatus for enabling internal data processing logic that includes a number of units clocked by an internal clock operating at a first frequency to operate with an external bus clocked by an external clock operating at a second frequency that is a fraction m/n of said first frequency comprising:

an internal bus connected to said number of units;

said internal bus including readers and drivers for effecting data transfer between said internal bus and said number of units; and, control means connected to said internal bus for controlling said readers and drivers;

said control means including priority logic connected to said readers and drivers, responsive to said number of units for determining priority between said units with respect to transfer of data on said external bus with a selected one of said units;

said control means further including first means operative upon a condition that m=1 and n is an integer of the integers 1, 2, and 3, for transferring data from said internal bus to said selected one of said units on every rising edge of said external clock and for transferring data from said selected one of said units to said internal bus at a point in time that said internal clock and said external clock are aligned.

12. The apparatus in accordance with claim 11 wherein:

said control means further includes second means operative upon a condition that m=2 and n=3, for transferring data from said internal bus to said selected one of said units on every external clock rising edge and for transferring data from said selected one of said units to said internal bus at the point in time that said internal clock and said external clock are aligned while preventing said priority logic from enabling said drivers during any period during which said internal clock and said external clock are not aligned.

13. The apparatus in accordance with claim 12 wherein:

said control means further includes third means operative upon a condition that m=1 and n is an integer of the integers 1, 2, and 3, for transferring data from said internal bus to said selected one of said units on every internal clock edge and for transferring data from said selected one of said units to said external bus at the point in time that said internal clock and said external clock are aligned; and, said control means further includes fourth means operative upon a condition that m=2 and n=3, for transferring data from said internal bus to said units on every internal clock edge and for transferring data from said units to said external bus at a point in time that said internal clock and said external clock are aligned while concurrently preventing said priority logic from enabling said drivers during any period during which said internal clock and said external clock are not aligned.

14. Apparatus for enabling internal data processing logic that includes a number of units clocked by an internal clock operating at a first frequency to operate with an external bus clocked by an external clock operating at a second frequency that is a fraction m/n of said first frequency comprising:

means for latching data;

a first bus connected to said means for latching data and to said number of units via readers for effecting data transfer from said means for latching data to said number of units;

a second bus;

said means for latching data being connected to said external bus and to said second bus;

said second bus being connected to said number of units via drivers for effecting data transfer from said units to said means for latching data; and, control means connected to said readers and drivers for controlling said readers and drivers;

said control means including priority logic connected to said readers and drivers, responsive to said number of units, for determining priority between said units with respect to transfer of data on said external bus;

said control means further including first means operative upon a condition that m=1 and n is an integer of the integers 1, 2, and 3, for transferring data from said external bus to said means for latching data on every external clock rising edge and for transferring data from said means for latching data to said first bus at the point in time that said internal clock and said external clock are aligned;

said control means further including second means operative upon a condition that m=2 and n=3, for transferring data from said external bus to said means for latching data on every external clock rising edge and for transferring data from said second bus to said means for latching data at the point in time that said internal clock and said external clock are aligned while preventing said priority logic from enabling said drivers during any period during which said internal clock and said external clock are not aligned.

15. The apparatus in accordance with claim 14 wherein:

said control means further includes third means operative upon a condition that m=1 and n is an integer of the integers 1, 2, and 3, for transferring data from said second bus to said means for latching data on every internal clock edge and for transferring data from said means for latching data to said external bus at the point in time that said internal clock and said external clock are aligned; and, said control means further includes fourth means operative upon a condition that m=2 and n=3, for transferring data from said second bus to said means for latching data every internal clock edge and for transferring data from said means for latching data to said second bus at a point in time that said internal clock and said external clock are aligned while concurrently preventing said priority logic from enabling said drivers during any period during which said internal clock and said external clock are not aligned.

16. Apparatus for enabling internal data processing logic that includes a number of units clocked by an internal clock operating at a first frequency to operate with an external bus clocked by an external clock operating at a second frequency that is a fraction m/n of said first frequency comprising:

an internal bus connected to said number of units;

said internal bus including readers and drivers for effecting data transfer between said internal bus and said number of units;

a bus state machine;

priority logic connected to said readers and drivers, and to said bus state machine, responsive to said number of units for determining priority between said units with respect to transfer of data on said external bus with a selected one of said units; and, said bus state machine including first logic operative upon a condition that m=1 and n is an integer of the integers 1, 2, and 3, for transferring data from said internal bus to said selected one of said units on every rising edge of said external clock and for transferring data from said selected one of said units to said internal bus at a point in time that said internal clock and said external clock are aligned.

17. The apparatus in accordance with claim 16 wherein:

said bus state machine further includes second logic operative upon a condition that m=2 and n=3, for transferring data from said internal bus to said units on every external clock rising edge and for transferring data from said units to said internal bus at the point in time that said internal clock and said external clock are aligned while preventing said priority logic from enabling said drivers during any period during which said internal clock and said external clock are not aligned.

18. The apparatus in accordance with claim 17 wherein:

said bus state machine further includes third logic operative upon a condition that m=1 and n is a positive integer, for transferring data from said internal bus to said units on every internal clock edge and for transferring data from said units to said external bus at the point in time that said internal clock and said external clock are aligned; and, said bus state machine further includes fourth logic operative upon a condition that m=2 and n=3, for transferring data from said internal bus to said units on every internal clock edge and for transferring data from said units to said external bus at a point in time that said internal clock and said external clock are aligned while concurrently preventing said priority logic from enabling said drivers during any period during which said internal clock and said external clock are not aligned.

19. Apparatus for enabling internal data processing logic that includes a number of units clocked by an internal clock operating at a first frequency to operate with an external bus clocked by an external clock operating at a second frequency that is a fraction m/n of said first frequency comprising:

data path latches for latching data;

a first bus connected to said data path latches and to said number of units via readers for effecting data transfer from said data path latches to said number of internal units;

a second bus;

said data path latches being connected to said external bus and to said second bus;

said second bus being connected to said number of units via drivers for effecting data transfer from said internal bus units to said data path latches; and, a bus state machine;

priority logic connected to said readers and drivers, and to said bus state machine, responsive to said number of units, for determining priority between said units with respect to transfer of data on said external bus with a selected one of said units; and, said bus state machine including first logic operative upon a condition that m=1 and n is an integer of the integers 1, 2, and 3, for transferring data from said external bus to said data path latches on every external clock rising edge and for transferring data from said means for latching data to said first bus at the point in time that said internal clock and said external clock are aligned;

said bus state machine further including second logic operative upon a condition that m=2 and n=3, for transferring data from said external bus to said data path latches on every external clock rising edge and for transferring data from said data path latches to said second bus at a point in time that said internal clock and said external clock are aligned while preventing said priority logic from enabling said drivers during any period during which said internal clock and said external clock are not aligned.

20. The apparatus in accordance with claim 19 wherein:

said bus state machine further includes third logic operative upon a condition that m=1 and n is an integer of the integers 1, 2, and 3, for transferring data from said second bus to said means for latching data on every internal clock edge and for transferring data from said means for latching data to said external bus at the point in time that said internal clock and said external clock are aligned; and, said bus state machine further includes fourth logic operative upon a condition that m=2 and n=3, for transferring data from said second bus to said data path latches every internal clock edge and for transferring data from said second bus to said data path latches at a point in time that said internal clock and said external clock are aligned while concurrently preventing said priority logic from enabling said drivers during any period during which said internal clock and said external clock are not aligned.

21. A method of enabling internal data processing logic that includes a number of units clocked by an internal clock operating at a first frequency to operate with an external bus clocked by an external clock operating at a second frequency that is a fraction m/n of said first frequency comprising steps of:

A. determining priority of access to said internal bus as between said units with respect to transfer of data on said external bus resulting in a selected one of said units being granted access to said internal bus;

B. transferring data from said internal bus to said selected one of said units on every rising edge of said external clock upon a condition that m=1 and n is a positive integer; and, C. transferring data from said selected one of said units to said internal bus at a point in time that said internal clock and said external clock are aligned upon said condition that m=1 and n is a positive integer.

22. A method of enabling internal data processing logic that includes a number of units clocked by an internal clock operating at a first frequency to operate with an external bus clocked by an external clock operating at a second frequency that is a fraction m/n of said first frequency comprising steps of:

A. determining priority of access to said internal bus as between said units with respect to transfer of data on said external bus resulting in a selected one of said units being granted access to said internal bus;

B. transferring data from said internal bus to said selected one of said units on every external clock rising edge upon a condition that m=2 and n=3;

C. transferring data from said selected one of said units to said internal bus at a point in time that said internal clock and said external clock are aligned; and, D. preventing said access to said internal bus during any period during which said internal clock and said external clock are not aligned upon said condition that m=2 and n=3.

23. A method of enabling internal data processing logic that includes a number of units clocked by an internal clock operating at a first frequency to operate with an external bus clocked by an external clock operating at a second frequency that is a fraction m/n of said first frequency comprising steps of:

A. determining priority of access to said internal bus as between said units with respect to transfer of data on said external bus resulting in a selected one of said units being granted access to said internal bus;

B. transferring data from said internal bus to said selected one of said units on every rising edge of said external clock upon a condition that m=1 and n is an integer of the integers 1, 2, and 3; and, C. transferring data from said selected one of said units to said internal bus at a point in time that said internal clock and said external clock are aligned upon said condition that m=1 and n is an integer of the integers 1, 2, and 3.

24. A method of enabling internal data processing logic that includes a number of units clocked by an internal clock operating at a first frequency to operate with an external bus clocked by an external clock operating at a second frequency that is a fraction m/n of said first frequency comprising steps of:

A. determining priority of access to said internal bus as between said units with respect to transfer of data on said external bus resulting in a selected one of said units being granted access to said internal bus;

B. transferring data from said internal bus to said selected one of said units on every external clock rising edge upon a condition that m=2 and n=3;

C. transferring data from said selected one of said units to said internal bus at a point in time that said internal clock and said external clock are aligned; and, D. preventing said access to said internal bus during any period during which said internal clock and said external clock are not aligned upon said condition that m=2 and n=3.

* * * * *

UNITED STATES PATENT AND TRADEMARK OFFICE
CERTIFICATE OF CORRECTION

PATENT NO. : 5,471,587
DATED : November 28, 1995
INVENTOR(S) : Fernando

It is certified that error appears in the above-identified patent and that said Letters Patent are hereby corrected as shown below:

Column 4, line 22, change "thone processor s" to -- the --.

Signed and Sealed this

Twenty-fourth Day of September, 1996

Attest:

BRUCE LEHMAN

Attesting Officer      Commissioner of Patents and Trademarks